United States Patent Office 3,592,666
Patented July 13, 1971

3,592,666
PROCESS FOR AVOIDING SPLITTING OF VEGETABLES DURING FREEZING
Paul Wayne Butler, Wilmington, Del., assignor to E. I. du Pont de Nemours and Company, Wilmington, Del.
No Drawing. Filed Feb. 10, 1969, Ser. No. 798,114
Int. Cl. A23b 1/06, 7/100
U.S. Cl. 99—193
3 Claims

ABSTRACT OF THE DISCLOSURE

In a process for freezing vegetables which are susceptible to surface splitting or cracking and/or whitening when frozen or while being frozen by a process which employs a liquid polyfluorinated halohydrocarbon having a normal boiling point of about −5° to −50° C. (23° to −58° F.) and a liquid density sufficient to float said vegetables, the improvement which comprises heating the vegetable throughout its mass to a temperature of 80°–100° C. (176°–212° F.) immediately prior to freezing.

BACKGROUND OF THE INVENTION (1) Field of the invention

This invention relates to a method for freezing vegetables which are susceptible to surface cracking or splitting and/or whitening when they have been or are being frozen by a quick freeze method employing a polyfluorinated halohydrocarbon.

(2) Description of the prior art

Surface cracking or splitting and/or whitening of vegetables has long been a problem in the food freezing industry. This problem is more prevalent when the vegetables are truly quick frozen, that is, using a contact time between food and freezant of only a few minutes or less, with contact times varying depending on the mass of the food piece. Such freezing may be exemplified by freezing methods using cryogenic fluids such as liquid nitrogen or liquid carbon dioxide, as disclosed in U.S. Pats. 3,070,447 and 3,114,248, or using fluoro- or chlorofluoroalkane liquids as disclosed in U.S. Pat. 3,368,363 and U.S. patent application Ser. No. 725,257 filed Apr. 19, 1968. Useful fluoroalkane freezants are those whose normal boiling points range from about −5° to −50° C. and whose densities at the boiling points are sufficient to float the food. The above-mentioned freezing methods, while offering many desirable advantages in preserving the freshness, color, taste and nutritive value of the food frozen, suffer from certain disadvantages; for example, they may induce surface cracking or splitting and/or whitening in certain vegetables. Vegetables which are prone to splitting and whitening include string beans, lima and shell beans, peas, corn, celery, beets, asparagus, carrots, tomatoes, thick stemmed vegetables such as broccoli, radishes, mushrooms, potatoes, green peppers, eggplant, and the like. This effect may vary in its severity within a particular vegetable. For example, an aged vegetable may be more susceptible to cracking and/or whitening than a fresh vegetable. This effect somewhat spoils the appearance of the food, thereby lessening its ultimate economic value. Canadian Pat. 763,671 discloses a method for lessening this drawback by precooling, to below room temperature, and partially freezing the food product before final freezing.

DESCRIPTION OF THE INVENTION

It has been found that vegetables which are prone to surface splitting or cracking and/or whitening as a result of being processed in a quick freezing method can be frozen satisfactorily without or with only a minor amount of splitting or cracking and/or whitening. The invention herein resides in heating the vegetable throughout its mass to 176° to 212° F. (80° to 100° C.), and immediately thereafter freezing the heated vegetable by a conventional freezing technique employing a liquid polyfluorinated halohydrocarbon having a normal boiling point of about −5° to −50° C. (23° to −58° F.) and a liquid density, at its boiling point, sufficient to float the food being frozen.

The heat-treated food pieces can be introduced directly into a pool of liquid freezant and frozen as in U.S. Pat. 3,368,363, or the immersion in liquid can be followed by a period when no liquid is applied and another period when a spray or liquid freezant is directed onto the food. This latter procedure is disclosed in U.S. patent application Ser. No. 725,257 filed Apr. 19, 1968 and abandoned July 23, 1969 in lieu of U.S. continuation-in-part application Ser. No. 800,683 filed Feb. 19, 1969 and issued Mar. 3, 1970 as U.S. Pat. 3,498,069. The advantages of the invention can be gained with the use of any liquid freezant in which freezing of food is accomplished at temperatures between −5° and −50° C. Suitable freezants are listed and described in column 5 of U.S. Pat. 3,368,363.

The heat treatment conveniently can be carried out concurrently with conventional vegetable processing steps such as washing or blanching. Combining the present invention with an enzyme-deactivating blanching treatment offers the additional advantages that the cooling step customary in blanching operations is eliminated, as is the need for large volumes of cooling water. Moreover, the present invention precludes or at least minimizes resumption of enzyme and bacterial activity. Such resumption of activity is precluded in present blanching methods through the use of sterilized cooling water.

The heat treatment can be carried out by a variety of techniques, preferably those which transfer heat to the vegetable quickly and efficiently. For example, heat may be applied by means of steam or hot water. Hot brine solutions, also, can be used. To achieve the maximum benefit from the present invention the vegetable must be heated throughout its mass to 176° to 212° F. It is preferable to heat to as high as possible within this range, such as to about 212° F. The treatment must be at least such as to heat the vegetable throughout its mass to the treating temperature. Over and above the minimum time to reach this temperature, the duration of treatment will vary with the severity of the cracking or splitting and/or whitening effect being overcome. This in turn will vary with, among other things, the vegetable, and the age of the vegetable, older vegetables generally requiring longer times. For the vegetables which are susceptible to this effect, heating times usually will vary between about 30 seconds and 10 to 20 minutes.

After the heat treatment the vegetable should be frozen immediately, that is, with a minimum of cooling. It is to be understood that there is an unavoidable finite time lapse between the end of heating and the freezing step. If an aqueous system is used to provide heat, the water usually is drained from the vegetable before the latter contacts liquid freezant. In order to gain the advantages of the present invention the heat-treated vegetable must not be allowed to cool below 90° F. (32° C.) Usually, it is not allowed to cool below about 160° F. (71° C.). The minimum temperature is determined by a variety of factors, for example, the vegetable being treated and its age. It is more important to maintain a higher temperature for an aged vegetable than for a fresh vegetable. To avoid having to take such factors into consideration, the temperature to which the vegetable is allowed to cool should be as close as possible to the treating temperature.

EXAMPLE 1

Fresh green beans, about 2 inches in length, were treated in boiling water (about 212° F., 100° C.) for 3 minutes. Three lots of 25 pieces each were removed from the water after the 3-minute treatment, placed in cold (32°–41° F., 0°–5° C.) water and held there for several minutes. The lots then were placed in liquid dichlorodifluoromethane (B.P. −21.6° F., −29.8° C.) and held there for 30 seconds. The frozen beans were removed and visually examined for cracks and splits, no effort being made to distinguish on the basis of crack size. The average number of beans split or cracked (for the three lots) was 93%.

Two lots of beans, 25 beans each lot, were treated in boiling water and cooled as described above. They then were placed in 2 weight percent aqueous sodium chloride solution heated to 176° F. (80° C.), held there one minute, and frozen and evaluated as described above. In this case, the average number of beans split or cracked (for the two lots) was 2%.

EXAMPLE 2

Fresh green beans, about 2 inches in length, were treated in boiling water (about 212° F., 100° C.) for 3 minutes. Three lots of 25 pieces each were removed from the water after the 3-minute treatment, placed in cold (32°–41° F., 0°–5° C.) water and held there for several minutes. The lots then were placed in liquid dichlorodifluoromethane (B.P. −21.6° F., −29.8° C.) and held there for 30 seconds. The frozen beans were removed and visually examined for cracks and splits, no effort being made to distinguish on the basis of crack size. The average number of beans split or cracked (for the three lots) was 87%.

Five lots of beans, 25 beans each lot, were treated in boiling water as described above and then, after draining, were immediately placed in liquid dichlorodifluoromethane and frozen and evaluated as described above. In this case, the average number of beans split or cracked (for the five lots) was 5%.

This example was repeated substantially as described above except that liquid nitrogen (B.P. −319.9° F., −195.5° C.) was used instead of dichlorodifluoromethane. In this case, the average number of beans split or cracked was still quite high even though the beans were heated and immediately frozen—about 50% of the number which split or cracked without the heating and immediate freezing—indicating the criticality of the freezant employed in the present invention.

EXAMPLE 3

Fresh ungraded lima beans were treated in boiling water (about 212° F., 100° C.) for 3 minutes. Four lots of 25 beans each were removed from the water after the 3-minute treatment, placed in cold (32°–41° F., 0°–5° C.) water and held there for 5 minutes. The lots then were placed in liquid dichlorodifluoromethane and held there for 60 seconds. The frozen beans were evaluated as in Example 1. The average number of beans split or cracked (for the four lots) was 86%.

Five lots of beans, 25 beans each lot, were treated in boiling water as described above and then, after draining, were immediately placed in liquid dichlorodifluoromethane and frozen and evaluated as described above. The average number of beans split or cracked (for the five lots) was 14%.

EXAMPLE 4

The importance of rapid freezing after the heat treatment is demonstrated by the following experiments. Thermocouples were imbedded in fresh green beans as used in Example 1 and the beans were treated in boiling water for 3 minutes. The internal bean temperature reached 212° F. (100° C.) in 90 to 100 seconds. The beans were removed from the water and held at room temperature of 77° F. (25° C.) and the cooling rate was determined. Based on an average of ten readings, the beans cooled to 203° F., 185° F. and 167° F. (95° C., 85° C. and 75° C.) in 12, 25 and 45 seconds, respectively.

Lots of 25 beans each were given the 3-minute boiling water treatment, then exposed to room temperature as above for varying lengths of time, and finally, frozen in dichlorodifluoromethane for 60 seconds (double the time used in Example 1). The following table shows the percentage of beans split or cracked after exposure to room temperature for varying times before freezing.

| Time (seconds): | Percent split |
|---|---|
| 0 | 0 |
| 10 | 28 |
| 15 | 40 |
| 60 | 40 |
| 300 | 72 |

EXAMPLE 5

Washed fresh potatoes, peeled to about 1½ inch diameter, were treated in boiling 5 weight percent aqueous sodium chloride for 5 to 10 minutes. After draining off the brine the potatoes were placed in liquid dichlorodifluoromethane for 8 to 9 minutes (until 85–90% frozen). The frozen potatoes were removed from the freezant, excess freezant was allowed to evaporate off for 30 to 60 seconds and the potatoes were stored at 0° F. (−18° C.). They were substantially free of splits or cracks.

The embodiments of the invention in which an exclusive property or privilege is claimed are defined as follows:

1. In a process for freezing vegetables which are susceptible to surface splitting or cracking or whitening when freezing is effected with an ebullient liquid polyfluorinated halohydrocarbon having a normal boiling point of −5° to −50° C. and a liquid density, at its boiling point, sufficient to float the vegetable, the improvement which comprises heating the vegetable throughout its mass to 80° to 100° C. and immediately thereafter, without being cooled to less than 32° C., subjecting the vegetable to the freezing step by directly contacting the vegetable with said ebullient liquid halohydrocarbon.

2. The process of claim 1 wherein the vegetable is heated in an aqueous medium to about 100° C. and the polyfluorinated halohydrocarbon is dichlorodifluoromethane.

3. The process of claim 1 wherein the vegetable is heated to about 100° C. by means of steam and the polyfluorinated halohydrocarbon is dichlorodifluoromethane.

References Cited

UNITED STATES PATENTS

| | | | |
|---|---|---|---|
| 3,070,447 | 12/1962 | Webster | 99—193 |
| 3,231,395 | 1/1966 | Duggan et al. | 99—193 |
| 3,297,454 | 1/1967 | Webster et al. | 62—64X |
| 3,298,188 | 1/1967 | Webster et al. | 62—63 |
| 3,368,363 | 2/1968 | Alaburda et al. | 62—64 |
| 3,404,989 | 10/1968 | Hirtensteiner | 99—193 |
| 3,476,573 | 11/1969 | Lester et al. | 99—193X |

OTHER REFERENCES

AVI, Publication: "Frozen Food Cookbook" (1962) p. 108.

Georgia Expt. Station Bulletin 201 (1938) pp. 33 and 37.

NORMAN YUDKOFF, Primary Examiner

F. E. DRUMMOND, Assistant Examiner

U.S. Cl. X.R.

99—198, 192